United States Patent [19]
Bellovin et al.

[11] Patent Number: 5,440,635
[45] Date of Patent: Aug. 8, 1995

[54] CRYPTOGRAPHIC PROTOCOL FOR REMOTE AUTHENTICATION

[75] Inventors: Steven M. Bellovin, Westfield; Michael J. Merritt, Berkeley Heights, both of N.J.

[73] Assignee: AT&T Corp., Murray Hill, N.J.

[21] Appl. No.: 110,595

[22] Filed: Aug. 23, 1993

[51] Int. Cl.$^6$ .............................................. H04K 1/00
[52] U.S. Cl. .......................................... 380/25; 380/30
[58] Field of Search ........................ 380/21, 23, 25, 28, 380/30, 44

[56] References Cited

U.S. PATENT DOCUMENTS

| | | | |
|---|---|---|---|
| 4,996,711 | 2/1991 | Chaum | 380/30 |
| 5,218,637 | 6/1993 | Angeband et al. | 380/23 |
| 5,222,140 | 6/1993 | Beller et al. | 380/30 |
| 5,241,599 | 8/1993 | Bellovin et al. | 380/21 |
| 5,345,506 | 9/1994 | Tsubakiyama et al. | 380/23 |

OTHER PUBLICATIONS

"Password Security: A Case History", by R. Morris and K. Thompson, *Communications of the ACM*, vol. 22 No. 11, pp. 594–597, Nov. 1979.

*Primary Examiner*—Tod R. Swann
*Attorney, Agent, or Firm*—Jason P. DeMont

[57] ABSTRACT

A cryptographic communication system is disclosed which permits computer users to authenticate themselves to a computer system without requiring that the computer system keep confidential the password files used to authenticate the respective user's identities. The invention is useful in that it prevents a compromised password file from being leveraged by crafty hackers to penetrate the computer system.

16 Claims, 1 Drawing Sheet

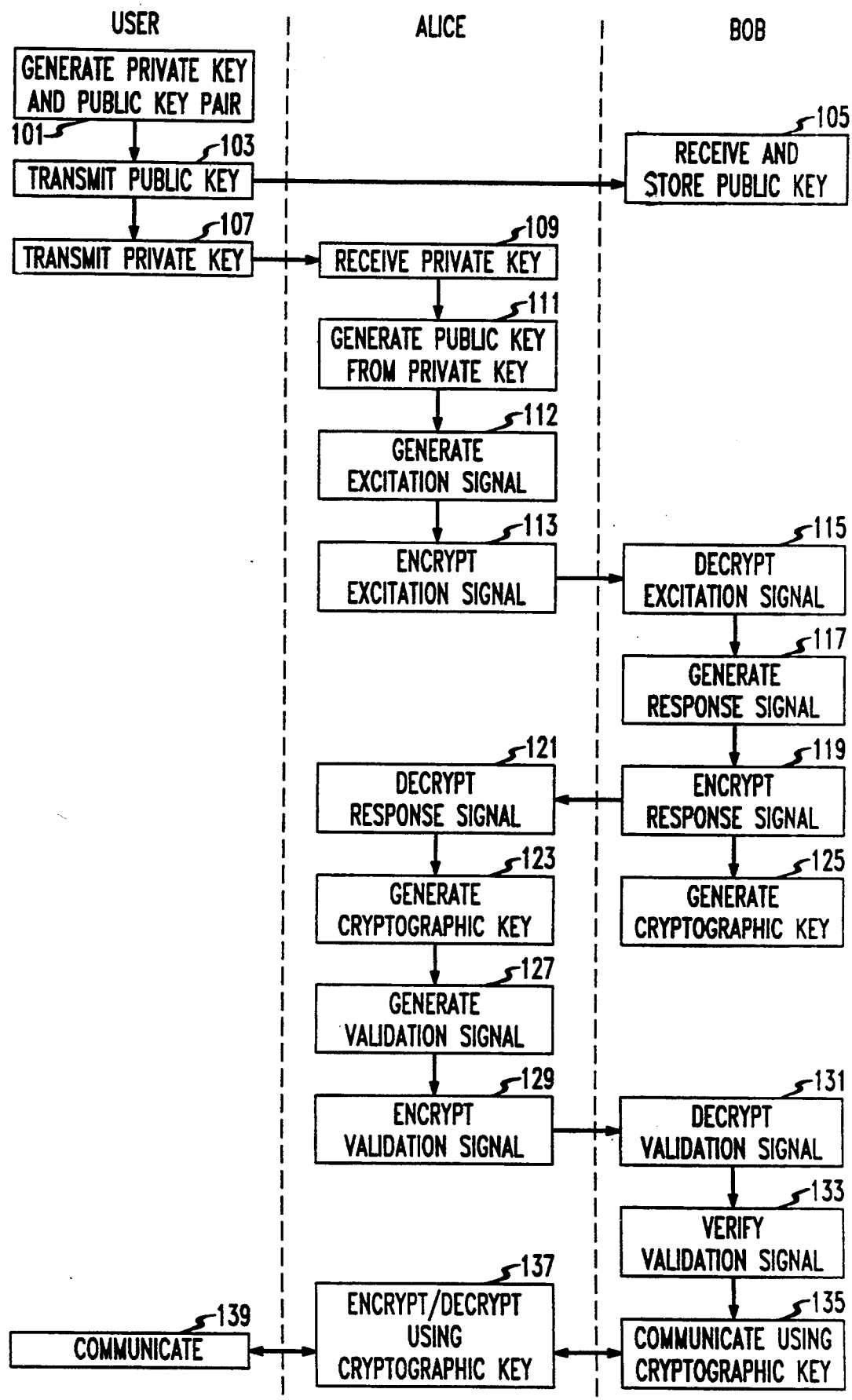

ized the Diffie-Hellman technique) and techniques taught in co-pending U.S. patent application Ser. No. 07/770,064. For the purposes of the illustrative embodiment, it is assumed that both Alice and Bob have access to a common set of Diffie-Hellman parameters, $\alpha$ and $\beta$, which can be distributed in well-known fashion.

CRYPTOGRAPHIC PROTOCOL FOR REMOTE AUTHENTICATION

CROSS REFERENCE TO RELATED APPLICATION

Allowed U.S. patent application Ser. Number 07/770,064, entitled "A Cryptographic Protocol for Secure Communications" by Steven M. Bellovin and Michael J. Merritt, filed Oct. 2, 1991, and assigned to the assignee of the instant application, is hereby incorporated herein as if set forth in its entirety.

BACKGROUND OF THE INVENTION

1. Field of the Invention

This invention relates to cryptographic communications in general and, more particularly, to methods and apparatus for private communications and remote authentication.

2. Description of the Related Art

Parties often wish to conduct private and authenticated communications. While privacy can be sought through physical means it is often more efficient and effective to employ cryptographic means. And while authentication can be sought through physically secure and dedicated facilities, it too can be accomplished more easily with cryptographic techniques.

In the prior art, this required that both parties to the communications kept a cryptographic key in their respective possession so as to be able to decrypt and/or authenticate the communications from the other party. When, for example, one of the parties is a computer system, it is inadvisable for the computer to store the cryptographic key either in clear form or in a reversibly-encrypted form. See R. H. Morris and K. Thompson, "UNIX Password Security," Communications of the ACM, Vol. 22, pp. 594 (Nov. 1979).

SUMMARY OF THE INVENTION

The present invention provides a mechanism for establishing private and authenticated communications between parties who share only a relatively insecure secret by using an approach different from the prior art, and while avoiding many of the costs and restrictions of prior cryptographic protocols. The communications conducted pursuant to the present invention are more secure than those established with the prior art and protect the shared secret (e.g., a password) from being revealed to an eavesdropper. Furthermore, one of the parties need not store the shared secret in a clear form or a reversibly-encrypted form; the advantage being that the shared secret cannot be stolen from them.

BRIEF DESCRIPTION OF THE DRAWING

FIGURE 1 depicts a flowchart of the operation of an illustrative embodiment of the present invention as between a computer system user, an intelligent terminal ("Alice"), and a computer system ("Bob").

DETAILED DESCRIPTION

FIGURE 1 depicts a flowchart of the operation of an illustrative embodiment of the present invention. The illustrative embodiment involves an exchange of signals between a computer system user ("the User"), a terminal with local computing capabilities to which the User has access ("Alice"), and a remote computer system ("Bob"). In the illustrative embodiment, the exchange of signals uses a public key distribution system (e.g., the Diffie-Hellman technique) and techniques taught in co-pending U.S. patent application Ser. No. 07/770,064. For the purposes of the illustrative embodiment, it is assumed that both Alice and Bob have access to a common set of Diffie-Hellman parameters, $\alpha$ and $\beta$, which can be distributed in well-known fashion.

In the illustrative embodiment, Bob is a multi-user computer system with a plurality of users, that uses password based techniques to authenticate those who attempt to gain access to Bob's resources. As shown in FIGURE 1 at 101, the User preferably generates an authentication signal (i.e., a password), $D_A$, such as a private key to a digital signature system or public key cryptosystem. Furthermore, the User also preferably generates a signal, $E_A$, which is a function of the authentication signal. While the signal, $E_A$, can be a hash function, or a one-way function of the authentication signal, it is preferred that it be the public key corresponding to the private key (i.e., the authentication signal) according to some digital signature system or public key cryptosystem, and that the public key, $E_A$, be derivable from the private key, $D_A$. It will be clear to those skilled in the art how to generate the authentication signal and its counterpart signal.

As shown at 103, the User transmits the public key, $E_A$, to Bob, which Bob maintains for later reference, at 105. It is preferred that Bob maintain the public key $E_A$ in confidence. Whenever the User desires access to Bob's resources, the User, at 107, provides the private key $D_A$ to Alice. Upon receipt of the private key, $D_A$, Alice derives, at 111, the public key, $E_A$, in well known fashion.

Next, at 112, Alice advantageously chooses a random number $R_A$, and with the Diffie-Hellman parameters $\alpha$ and $\beta$, forms an excitation signal:

$$\alpha^{R_A} \bmod \beta$$

in well known fashion.

Next, at 113, Alice advantageously, although not necessarily, encrypts at least a portion of the excitation signal with a first symmetric key cryptosystem and a key based on $E_A$, to form the outgoing message $E_A(\alpha^{R_A}\bmod\beta)$, which is transmitted to Bob. Alice may also transmit the User's identity to Bob.

As shown at 115, Bob receives the encrypted excitation signal (i.e., the outgoing signal), and having access to E A, advantageously decrypts it, if it is encrypted, to recover $\alpha^{R_A}\bmod\beta$. Bob, as shown at 117, next advantageously chooses a random number $R_B$, forms the response signal, Q:

$$Q = \alpha^{R_B} \bmod \beta$$

in well known fashion. Next, at 119, Bob advantageously, although not necessarily, encrypts at least a portion of the response signal, Q, with a second symmetric key cryptosystem and a key based on $E_A$, to form the incoming message $E_A(Q)$, which is transmitted to Alice. Having both $R_B$ and the excitation signal, $\alpha^{R_A}\bmod\beta$, Bob preferably generates, at 125, a cryptographic key, K, in well known fashion.

At 121, Alice receives the incoming message, and knowing $E_A$, decrypts it, if it is encrypted, to recover the response signal, Q. As shown at 123, Alice preferably uses $R_A$ and the response signal, Q, to form the cryptographic key, K:

$K = Q^{R_A} \bmod \beta$ in well known fashion.

Alice, at 127, preferably performs a second function (e.g., a hash function, a digital signature) on the authentication signal $D_A$ and the newly created cryptographic key K, to form a validation signal $F_2(D_A, K)$. It is preferred that public key technology be employed such that the second function uses the authentication signal $D_A$ to "sign" the cryptographic key K, in well known fashion, to form $D_A(K)$. As shown at 129, at least a portion of the validation signal, $F_2(D_A, K)$, is preferably encrypted with a third symmetric key cryptosystem and a key based on the cryptographic key, K, in well known fashion, to form the encrypted validation signal. The encrypted validation signal is then transmitted to Bob.

At 131, Bob receives and, knowing K, decrypts the validation signal, in well known fashion. At 133, Bob verifies that the validation signal $F_2(D_A, K)$ originates from an entity having possession of both the authentication signal $D_A$ and the newly formed cryptographic key K. Preferably, Bob, using the signal $E_A$, verifies the validation signal by ensuring that $D_A(K)$ is the correct signature of the cryptographic key, K, (i.e., checking to make sure that $E_A(D_A(K)) = K$). When the check at 133 succeeds, Bob is assured of the User's authenticity and can thereafter communicate with Alice using the cryptographic key K. Alice, at 137, advantageously uses the cryptographic key K to decrypt messages from Bob and passes the plaintext message to the User. Preferably, any two, or all three of the first, second and third symmetric key cryptosystems are the same.

What is claimed is:

1. A method for generating a first cryptographic key to a first symmetric key cryptosystem, said method comprising:
   generating an authentication signal, $D_A$, that is not revealed to a remote party;
   generating a first one-way function of said authentication signal, $E_A$;
   transmitting said first function of said authentication signal, $E_A$, to said remote party;
   forming an excitation signal based on a first signal, $R_A$;
   forming an outgoing signal by encrypting at least a portion of said excitation signal with a second symmetric key cryptosystem and a second key that is based on said first function of said authentication signal;
   transmitting said outgoing signal to said remote party;
   receiving a response signal, Q, in response to said outgoing signal;
   generating said first cryptographic key based on said first signal and on said response signal;
   generating a validation signal based on a second function of said first cryptographic key and said authentication signal; and
   transmitting said validation signal to said remote party.

2. The method of claim 1 further comprising the step of encrypting at least a portion of said validation signal with a third symmetric key cryptosystem and a third key based on said first cryptographic key.

3. The method of claim 2 wherein said first symmetric key cryptosystem, said second symmetric key cryptosystem, and said third symmetric key cryptosystem are identical.

4. The method of claim 1 wherein said step of forming an excitation signal comprises the step of setting said excitation signal to $\alpha^{R_A} \bmod \beta$, where $\alpha$ and $\beta$ are numbers.

5. The method of claim 4 wherein said step of generating a first cryptographic key comprises the step of setting said first cryptographic key to $Q^{R_A} \bmod \beta$.

6. The method of claim 1 wherein said second function is a one-way function.

7. The method of claim 1 wherein said first function is a hash function and said second function is a hash function.

8. The method of claim 1 wherein said second function is a digital signature function.

9. A method for generating a first cryptographic key to a first symmetric key cryptosystem, said method comprising:
   receiving a public key to a public key cryptosystem;
   receiving an outgoing message from a remote party;
   decrypting said outgoing message with said public key to recover an excitation signal, Q;
   forming response signal based on a first signal, $R_B$;
   encrypting said response signal with a second key based on said public key to form an incoming signal;
   transmitting said incoming signal to said remote party;
   generating said first cryptographic key based on said first signal, $R_B$, and on said excitation signal;
   receiving a validation signal that is based on a second function of said first cryptographic key and said public key; and
   verifying said validation signal with said public key.

10. The method of claim 9 further comprising decrypting at least a portion of said validation signal with a third symmetric key cryptosystem and a third key based on said cryptographic key.

11. The method of claim 9 wherein said first symmetric key cryptosystem, said second symmetric key cryptosystem, and said third symmetric key cryptosystem are identical.

12. The method of claim 9 wherein said step of forming an response signal comprises the step of setting said excitation signal to $\alpha^{R_B} \bmod \beta$, where $\alpha$ and $\beta$ are numbers.

13. The method of claim 12 wherein said step of generating a cryptographic key comprises the step of setting said cryptographic key to $Q^{R_B} \bmod \beta$.

14. The method of claim 9 wherein said second function is a one-way function.

15. The method of claim 9 wherein said first function is a hash function and said second function is a hash function.

16. The method of claim 9 wherein said second function is a digital signature function.

* * * * *